R. L. DEZENDORF.
MEANS FOR AND METHOD OF TESTING GAS METERS.
APPLICATION FILED AUG. 14, 1919.
1,396,817.
Patented Nov. 15, 1921.
2 SHEETS—SHEET 1.
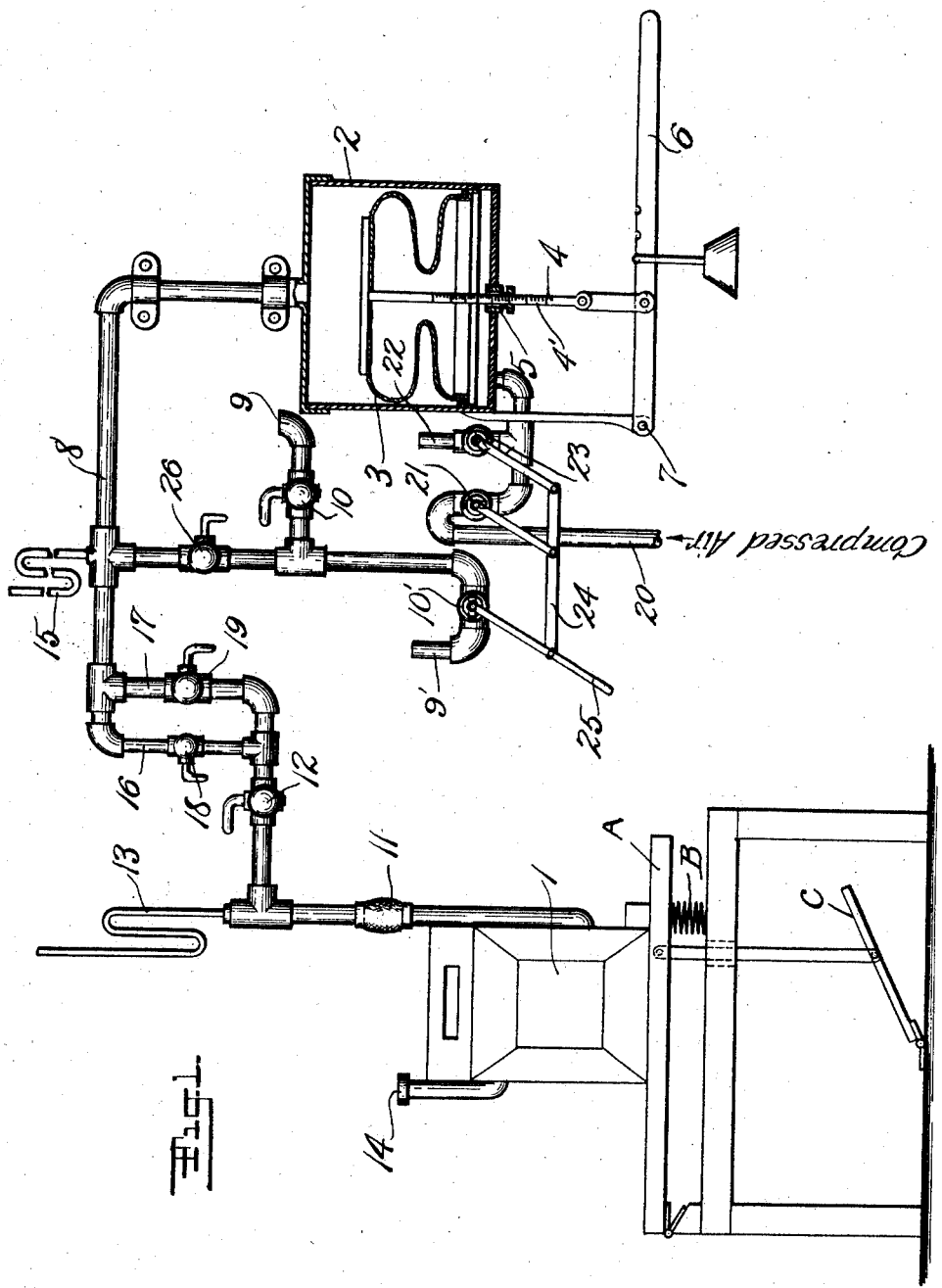
INVENTOR
R. L. Dezendorf
BY
ATTORNEYS

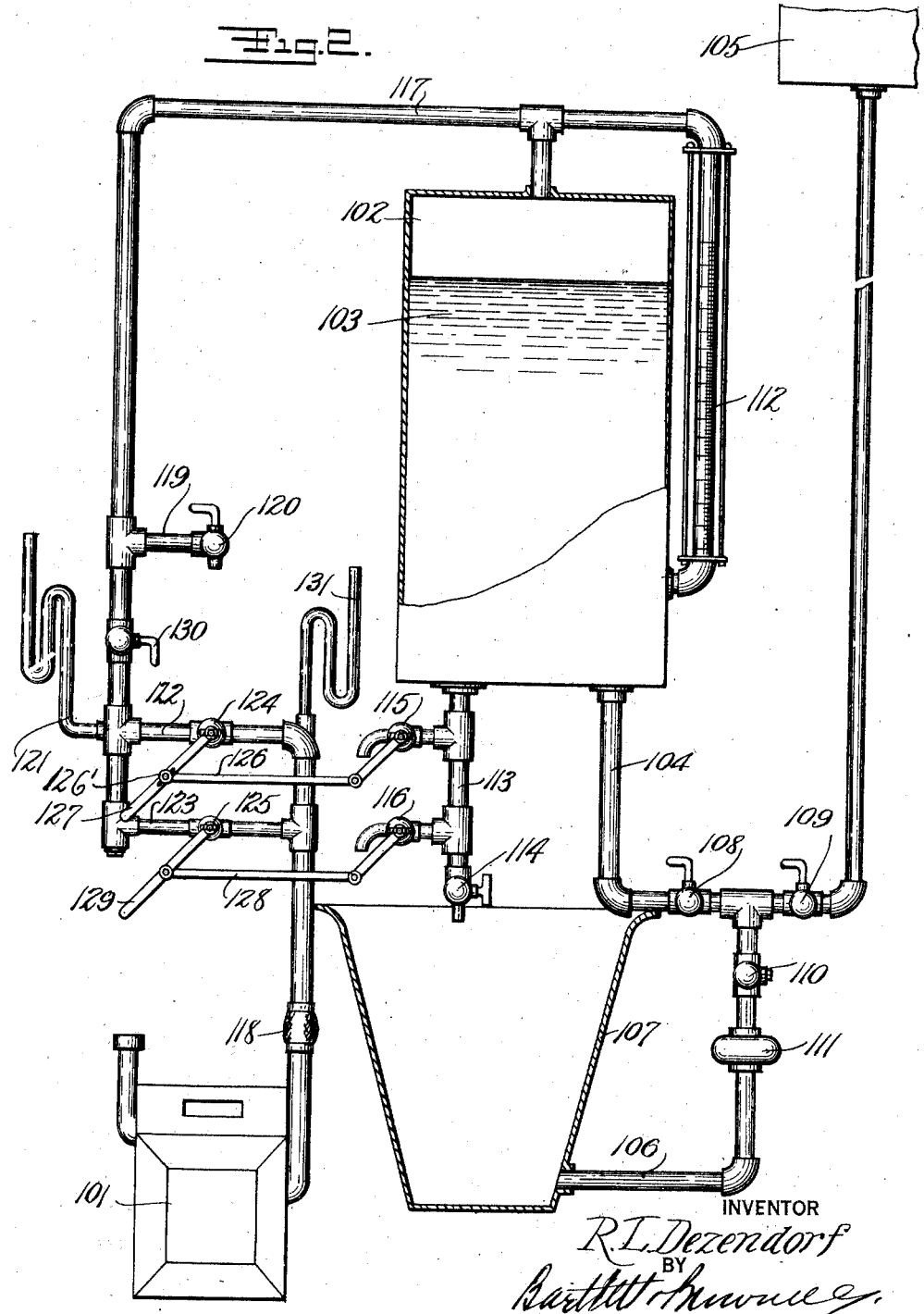

UNITED STATES PATENT OFFICE.

RICHARD L. DEZENDORF, OF RICHMOND HILL, NEW YORK.

MEANS FOR AND METHOD OF TESTING GAS-METERS.

1,396,817.  Specification of Letters Patent.  Patented Nov. 15, 1921.

Application filed August 14, 1919. Serial No. 317,475.

*To all whom it may concern:*

Be it known that I, RICHARD L. DEZENDORF, a citizen of the United States, residing at Richmond Hill, county of Queens, State of New York, have invented certain new and useful Improvements in Means for and Methods of Testing Gas-Meters, of which the following is a full, clear, and exact description.

My invention relates to improvements in means for and method of testing gas meters and has for its object to provide means for determining whether the valves and diaphragm of the meter are tight.

One feature of my invention consists in supplying a testing apparatus to be applied to the outlet port of a meter so that it is suitable for testing both "open top" meters and "closed top" meters. Heretofore it has been very difficult to test "open top" meters, but by my means and method it becomes a comparatively simple operation and secures remarkably accurate results. Another feature of my invention consists in employing in such testing apparatus means for producing a vacuum which draws air through the outlet port of the meter. Another feature of my invention is that my means can be employed for producing a reverse pressure applied to the outlet port of the meter which is particularly useful in detecting small leaks, such as "oil" leaks, by which I mean leaks which are not ordinarily detected on account of the trapped oil or on account of oil deposited in a leaky seam, which tends to seal any leaks when tested by ordinary means. Another feature of my invention consists in using an apparatus which can also be used to apply pressure to the inlet or outlet port of a meter, if desired. Another feature of my invention is the employment of a means and method whereby gas meters can be tested by air without resorting to gas from the mains and whereby the necessity of using a burner is eliminated.

The accompanying drawings show an embodiment of my apparatus invention and means for carrying out my method, Figure 1 showing one embodiment of my improved testing means connected to the outlet port of a gas meter whose cover has been removed, parts being in section, and Fig. 2 showing a modification.

Referring more particularly to the drawings, 1 is a meter to be tested with its cover or top removed; 2 is a chamber having therein a flexible diaphragm piston; 3 is the diaphragm secured adjacent to one end of the chamber 2 and actuated by a rod 4 passing through a close fitting guide 5 in the closed lower end of the chamber and operated by a lever 6 pivoted at 7. 8 is a connection leading from the chamber and coupled at 11 to the outlet port of the meter. 9 is an outlet connected with the interior of the chamber 2 and provided with a cock 10 so that it can be opened and closed. The connection 8 is provided with a stop-cock 12 and between the stop-cock 12 and the outlet port 11 is a water gage 13. 14 is the inlet of the meter. 15 is a second gage in direct connection with the upper portion of the chamber 2. 16 and 17 are small and large branches between the cock 12 and the chamber 2 constituting calibrated passages for permitting small and large amounts of air to be drawn through the meter 1. 18 and 19 are cocks for closing the passages through the branches 16 and 17 respectively. 9' is a supplemental port connected to the upper part of the chamber 2 through a cock 10'. 20 is a pipe leading from a source of compressed air and connected to the bottom of the chamber 2. 21 is a cock for controlling the flow of air through the pipe 20. 22 is a vent for the lower part of the chambers 2 and 23 is a cock for opening and closing said vent. The cocks 10', 21 and 23 are provided with levers connected to a bar 24 so that all three cocks can be simultaneously actuated by the handle 25. The cocks 10' and 21 are open when the cock 23 is closed and vice versa. 26 is a supplemental cock cutting off both vents 9 and 9' from the upper part of the chamber 2.

In using my apparatus above described to test the valves and diaphragm for leakage, I remove the cover of the meter and disconnect the flag arms of the meter from the tangent, so that the valves of the meter are kept stationary, as in ordinary practice. I then connect my apparatus to the outlet port 11 of the meter, as shown, the connection 8 being provided with a rubber tip for that purpose. The cock 26 being open, I then move the handle 25 to the left to the position shown, opening the cocks 10 and 21 and closing 23. The compressed air enters the chamber 2 below the diaphragm 3 and raises the diaphragm 3 so as to expel the air from the upper portion of the chamber 2. I thereupon move the lever 25 so as to close the cocks 10 and 21 and open the cock 23 and depress the diaphragm 3 by means of the lever 6 with the cocks 12, 18 and 19 open until the gage 13 shows the desired vacuum, preferably about one inch. I thereupon close the cock 12 so that ingress of air to the gage, except through said meter outlet port, is prevented, and watch the gage 13. This gives a very delicate indication of conditions within the meter, and if there is any leakage in the valves or diaphragm of the meter the water in the gage 13 will fall so as to indicate the change in the partial vacuum. Care must be taken to make a tight joint at the outlet 11. I prefer to make this connection by holding the outlet port against the rubber tip by means as shown the same consisting of a hinged platform A normally held in upward position by a spring B and adapted to be lowered by depressing a pedal C connected thereto. If the parts of the meter tested are not tight the water in the gage 13 will fall, whereupon the meter must be inspected to discover the points at which it is leaking, in a manner well understood to those skilled in the art, and be repaired.

The method above described can be carried out with my apparatus both on "open top" meters and on "closed top" meters, but is particularly useful in connection with "open top" meters on account of the difficulties heretofore experienced due to the valves in the "open top" meter being exposed. Furthermore, in testing "open top" meters by means of pressure on the inlet port of the meter, the pressure tends to lift the valves and indicate leaks for that reason. In using my apparatus as above indicated this objection is not present, since the higher the vacuum produced the more firmly are the valves held to their seats. On that account quite high vacuums can be used if desired.

If for any reason the compressed air should fail the diaphragm can be raised by the lever 6, the port 22 and vent 9 being open and upon closing the cock 10 the partial vacuum can be attained and the meter tested by the gage 13 in the manner described.

I also use my described apparatus for further testing the meter by depressing the diaphragm 3, the cocks 10', 23 and 26 being open and the cock 21 closed so as to fill the chamber 2 with air. I then close the cock 26 and move the lever 25 to raise the diaphragm 3, the cocks 12 and also 18 or 19 being open, and the inlet port 14 of the meter having been first closed tightly by a suitable cap or plug. After producing enough pressure within the chamber 2 to raise the water in the gage 13 six (6) inches or more, as desired, I close the cocks 12 and 21. If the water in the gage 13 remains in its elevated position it indicates there is no leakage in the meter when the pressure is applied in this direction also, so that the meter has been tested by vacuum and pressure.

This double test is particularly useful in detecting "oil" leaks, which are leaks which are temporarily stopped by trapped oil so as not to be evident sometimes on a single test or on an ordinary pressure test.

The apparatus described can also be used for testing the meter under large load and small load to determine whether it registers accurately under those conditions. In making this test the apparatus is connected to the outlet port, as shown, the top of the meter being open and the flag arms connected to the tangent. The cock 10 is then closed, the cock 26 being open, and the diaphragm 3 raised by opening the cocks 10' and 21 and closing cock 23. The positions of these cocks are then reversed and the cock 12 and the cock 18 opened. The diaphragm 3 is then lowered so as to maintain the water in the gage 15 at a point which indicates about two-inch vacuum. The registration on the dial of the meter is noted and the diaphragm 3 is further lowered until a predetermined amount of air has been drawn through the meter, as indicated by the scale 4' on the rod 4, when the meter dial is again read. If the reading is not correct the tangent is adjusted and the operation repeated until the registration is substantially correct. The operation is then repeated with the cock 19 open and the tangent again adjusted, if necessary, until the registration is substantially correct for both small and large loads.

Fig. 2 shows a modified form of apparatus in which a water piston is used in place of a diaphragm piston. In this embodiment 101 is the meter, the outlet port of which is connected to a testing apparatus in the manner above described. 102 is a chamber containing water 103 constituting a liquid piston. 104 is a connection leading from the chamber 102 to a tank 105. 106 is a branch from said connection opening into the lower part of a receptacle 107. 108 and 109 are cocks on each side of the branch 106. 110 is a check valve in the branch 106 and 111 is a motor pump attached to pump water from the receptacle 107 to the tank 105 when the cock 109 is open or to the chamber 102 direct when the cock 108 is open. 112 is a water gage connected to the chamber 102 at its lower end and to the upper end of the chamber 102, as indicated. 113 is a discharge connection from the bottom of the chamber 102 discharging into the tank 107 through the pet cock 114 and the cocks 115 and 116. 117 is a connection leading from upper part of the tank 102 and the upper part of the water gage 112. This connection leads to the outlet port of the meter 118. Between the outlet port of the meter and the chamber 102 is a vent 119 controlled by the cock 120, also a water gage 121. Between the water gage 121 and the meter are branch connections 122 and 123, the former being a large connection while the latter is a small connection corresponding to a small load upon the meter. 124 and 125 are cocks controlling these connections. The cocks 124 and 115 are provided with levers connected by a bar 126 and actuated by a handle 127 so that when the cock 124 is open the cock 115 is also open and when the cock 124 is closed the cock 115 is closed. The cocks 125 and 116 are also provided with levers connected by a bar 128 and actuated by a handle 129 so that when the cock 125 is open the cock 116 is open and when the cock 125 is closed the cock 116 is closed. 130 is a supplemental cock in the connection 117. 131 is a water gage located on the connection 117 on the meter side of the cocks 124 and 125.

In operating this apparatus to test the valves for leakage, water is admitted to the chamber 102 so as to force the air out through the vent 119, the cock 120 being open and the cocks 114, 115, 116, 124 and 125 being closed. Thereupon the cock 120 is closed and the cocks 115, 124 and 130 opened so that the water tends to flow out of the chamber 102 and produces a partial vacuum at the outlet of the meter indicated at the gage 131. When this indication reaches about one inch water gage, I close the cocks 115 and 124 or the cock 130 and watch the gage 131. If there is any leakage in the valves, the water in the gage 131 will fall so as to indicate the change in air pressure.

A reverse pressure for "oil leak" tests can also be established at the outlet port of the meter in a manner similar to that described in connection with the apparatus of Fig. 1. In carrying out this test the cocks 114, 115 and 116 should be closed when cock 124 is open. I provide for this by making the bar 126 detachable at 126′.

The operation of the meter for correct registration can also be carried out by the modification of Fig. 2, by forcing out the air from chamber 102 and then actuating cocks 124 and 115 so as to draw air through the meter at full load and later repeating the process by causing the air to be drawn through cock 125 and comparing the registrations with the amounts of water escaped from the chamber 102 as indicated by the scale on the water gage 12.

As will be evident to those skilled in the art, my invention permits of various modifications without departing from the spirit thereof or the scope of the appended claims.

What I claim is:

1. In a means for testing a gas meter, the combination of a chamber, a connection leading from said chamber to the outlet port of the meter to be tested, a cock in said connection for controlling the passage of air therethrough, a gage connected to said connection between said cock and said outlet port, a vent connected to the interior of said chamber, a valve for controlling said vent, and means for forcing air in said chamber out through said vent and drawing air into said chamber through said meter, said connection having two branches of different sizes, and means for opening and closing said branches.

2. In a means for testing a gas meter, the combination of a stationary chamber, a connection leading from said chamber to the outlet port of the meter to be tested, a cock in said connection for controlling the passage of air therethrough, a gage connected to said connection between said cock and said outlet port, a vent connected to the interior of said chamber, a valve for controlling said vent, a piston within said chamber, and means for causing said piston to move first in one direction and then in the other direction a sufficient distance to make a test of said meter for each complete stroke of the piston.

3. In a means for testing a gas meter, the combination of a stationary chamber, a connection leading from said chamber to the outlet port of the meter to be tested, a cock in said connection for controlling the passage of air therethrough, a gage connected to said connection between said cock and said outlet port, a vent connected to the interior of said chamber, a valve for controlling said vent, a piston within said chamber, and means for causing said piston to move first in one direction and then in the other direction a sufficient distance to make a test of said meter for each complete stroke of the piston, said connection having two branches of different sizes, and means for closing and opening said branches.

4. In a means for testing a gas meter, the combination of a chamber, a connection leading from said chamber to the outlet port of the meter to be tested, a cock in said connection for controlling the passage of air therethrough, a gage connected to said connection between said cock and said outlet port, a vent connected to the interior of said chamber, a valve for controlling said vent, said chamber having a piston, and means for causing said piston to move, said means comprising a pipe connected to said chamber and leading to a source of fluid pressure, and means for controlling the passage of fluid from said source through said pipe and alternately venting the spaces above and below said piston.

5. The method of testing a gas meter, which consists in connecting a gage to the outlet port of said gas meter, the valves of said meter being kept stationary, partially exhausting the air within said meter through said outlet port, and thereafter preventing ingress of air to said gage except through said outlet port, and observing the action of said gage.

RICHARD L. DEZENDORF.